Nov. 8, 1949 R. L. HALLOCK 2,487,129
SELF-LOCKING DEVICE
Filed April 5, 1944 2 Sheets-Sheet 1
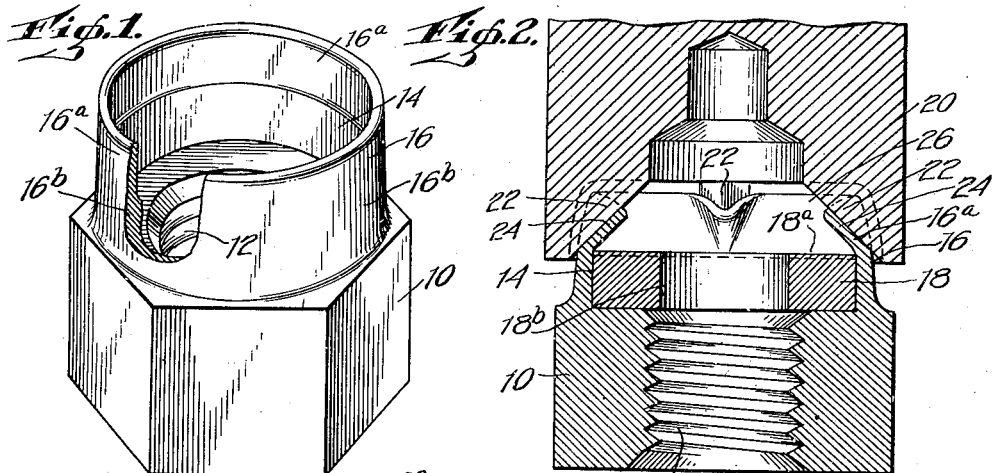
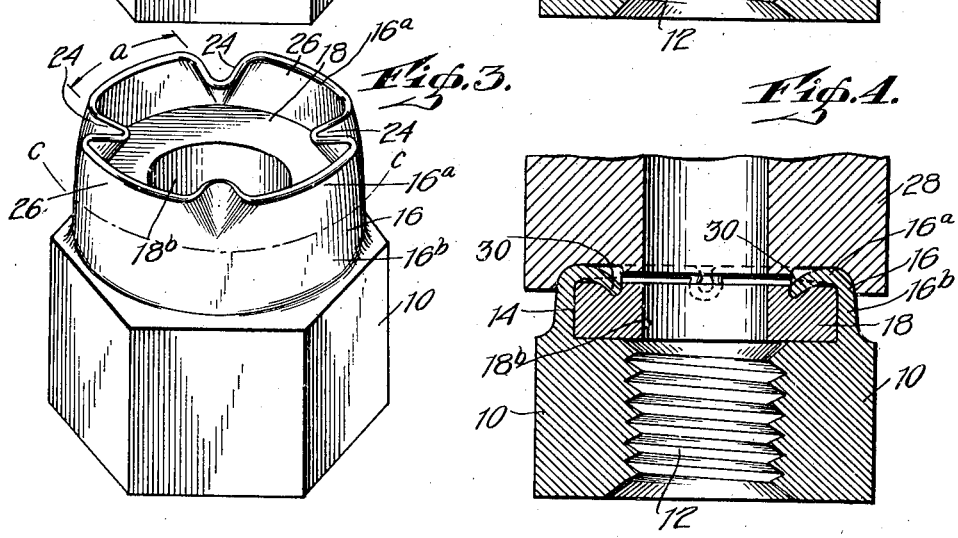
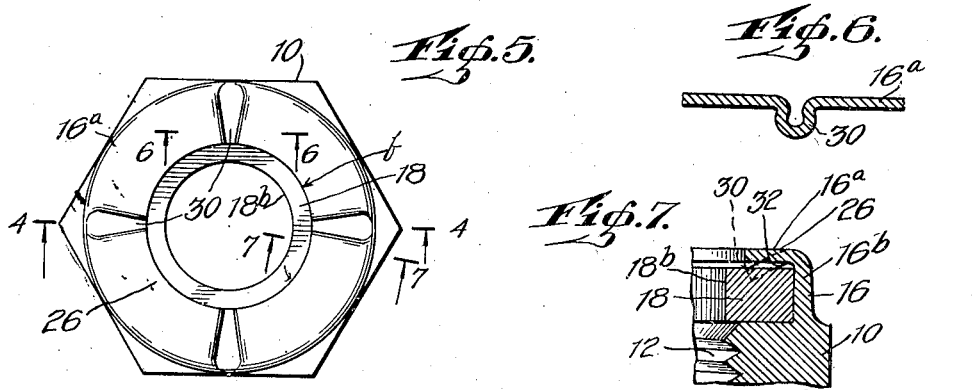
INVENTOR
Robert Lay Hallock
BY Jarvis C. Marble
his ATTORNEY Nov. 8, 1949  R. L. HALLOCK  2,487,129
SELF-LOCKING DEVICE
Filed April 5, 1944  2 Sheets-Sheet 2
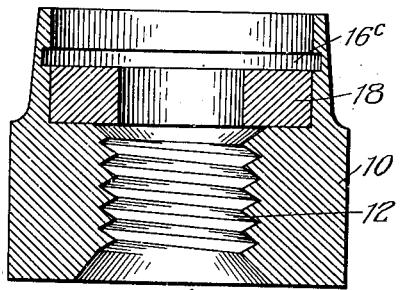
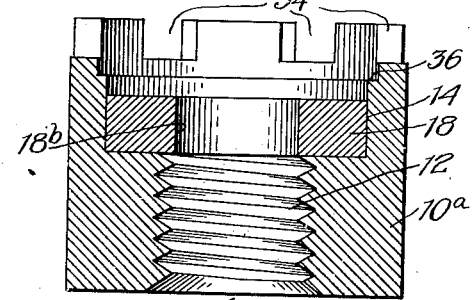
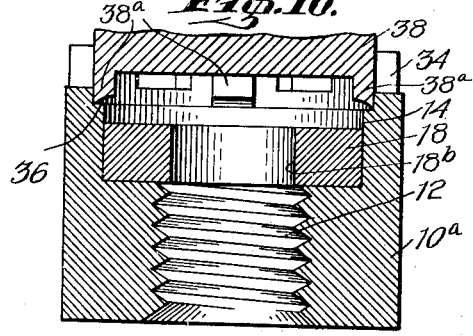
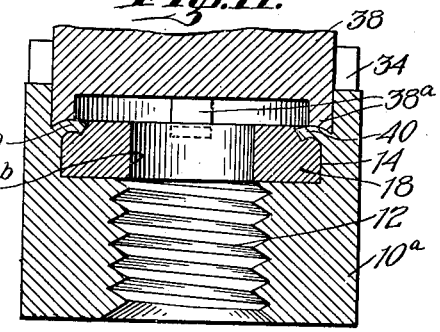
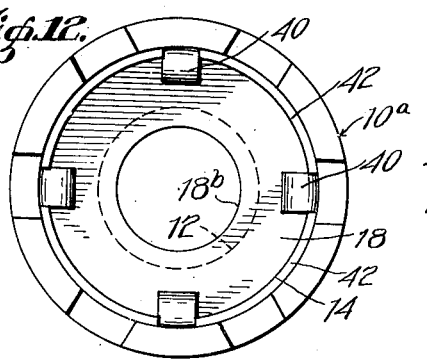
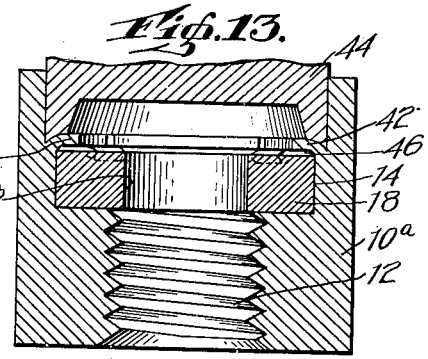
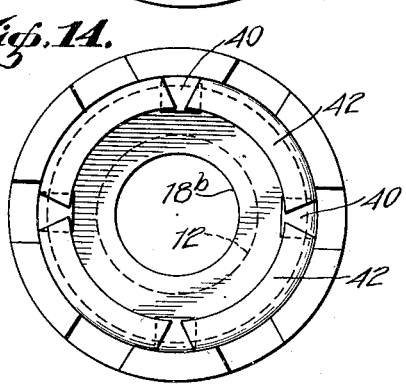
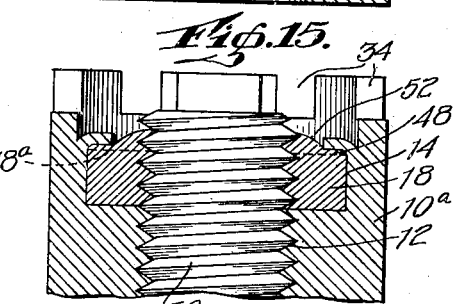
INVENTOR
Robert Lay Hallock
BY
Jarvis C. Marble
his ATTORNEY Patented Nov. 8, 1949

2,487,129

UNITED STATES PATENT OFFICE 2,487,129

SELF-LOCKING DEVICE

Robert Lay Hallock, Larchmont, N. Y., assignor to Elastic Stop Nut Corporation of America, Union, N. J., a corporation of New Jersey Application April 5, 1944, Serial No. 529,604

10 Claims. (Cl. 151—7)

The present invention relates to self-locking devices, more particularly self-locking nuts, and has particular reference to screwthreaded self-locking devices of the kind in which a locking insert of elastic material is fixed in a recess or well at one end of a threaded bore, to be engaged and have a thread impressed therein by a threaded element such as a screw or bolt which has been threaded through the associated bore.

In the usual form of such devices, which have gone into extensive commercial use, the locking insert is of relatively soft non-metallic material, the most satisfactory material so far developed being laminated compressed fiber usually referred to commercially as "vulcanized fiber."

For manufacturing reasons, the insert receiving wells in devices of the kind under consideration are, in practically all instances, made circular, the locking insert taking the form of an annular ring-like washer or a plurality of such washers superimposed upon each other. These washers are held against axial displacement by inturning material of the body in which the washer is assembled, over the top of the washer by punch-press operations of a crimping nature, the axial pressure of the inturned material on the washer also tending to hold it against rotation in the circular well. Axial pressure alone has been found to be not sufficiently positive and reliable in all cases for preventing turning of the washer and to assist in locking the washer in place the inturned rim or lip has, in accordance with past constructions, been indented at spaced places to provide indentations or "stakes" penetrating the surface of the washer to act as additional means for preventing rotation.

In the usual crimping operations as heretofore employed, the wall or rim of the well is crimped over by a cold working punchpress operation which tends, among other things, to deform the wall of the well below the level of the top of the washer, which in turn produces an undesirable radial shearing effect on the upper portion of the washer. Also, as heretofore practiced, the relatively shallow indentations or stakes that can be put into the retaining rim require that the rim be crimped tightly over the top of the washer. Due to unavoidable variations in the depth of the washer well, washer thickness and other manufacturing variations, it is difficult to exactly control the axial pressure exerted on the washer by the retaining lip after the washer is assembled; and if the well is even slightly shallower than normal due to a manufacturing variation or the washer is slightly thicker than normal for the same reason, the inturned rim will bite into the upper portion of the washer more than is desirable and in many cases break down the structure of this portion of the washer particularly when the washer is also subjected to radial shear because of the deformation of the wall below the lip. If, on the other hand, the washer well is slightly deeper than normal due to manufacturing variation or the washer is slightly under normal thickness, or both, then the lip may not be crimped over tightly enough on the washer so that even with the addition of stakes made by indenting the rim, the washer will be sufficiently restrained against turning in the well.

Furthermore, due to the nature of methods heretofore employed for locking the washer in its well, and which leave normally no room for expansion of the washer in the well, the diameter of the inner bore of the washer must be made substantially larger than the minor diameter of the screwthread. The reason for this is that the washer is initially unthreaded and must have its thread formed in it by a bolt or screw passing through the washer. Experience has shown that with the usual washer material employed, clearance space must be provided at the root of the bolt thread for the reception of material displaced by the bolt threads when they form the thread in the washer. If this clearance between the bore of the washer and the root of the bolt thread is not provided, in the case where a washer is gripped tightly with no axial clearance, the bolt, if forced through the washer, will in most instances force the displaced material upwardly ahead of the bolt to an extent such that the washer will be seriously damaged if not rendered entirely useless.

From the foregoing discussion, it will be evident that numerous difficulties are involved in uniformly and effectively assembling locking washers of the kind under consideration without damage to the washers and with certainty of their being assembled in all cases without possibility of turning from their assembled positions; and the present invention has for its general object the provision of a new and improved device of the kind described and methods of manufacture thereof which will eliminate the difficulties heretofore encountered in assembling such devices and provide a product of improved quality, as will hereinafter be more particularly pointed out.

Other and more detailed objects of the invention, together with the advantages to be derived from its use, may best be understood from the ensuing portion of this specification, taken in conjunction with the accompanying drawings, in which the principles of the invention are shown, by way of example but without limitation, as applied to self-locking nuts.

In the accompanying drawings:

Fig. 1 is a perspective view, partly in section, of a semi-finished blank for a self-locking nut embodying features of the invention;

Fig. 2 is a section showing the blank of Fig. 1 with a locking insert therein and with a preliminary closing operation performed thereon by a closing punch;

Fig. 3 is a perspective view similar to Fig. 1, showing the nut and washer after the preliminary operation of Fig. 2 has been performed;

Fig. 4 is a section similar to Fig. 2, showing the nut after the final closing operation has been performed;

Fig. 5 is a top plan view of the nut after the closing has been completed;

Fig. 6 is a fragmentary section taken on the line 6—6 of Fig. 5;

Fig. 7 is a fragmentary section taken on the line 7—7 of Fig. 5;

Fig. 8 is a fragmentary section showing a nut embodying the invention having a different form of rim;

Fig. 9 is a section of another form of nut blank and washer adapted to be assembled in accordance with the present invention;

Fig. 10 is a section showing a punch about to perform the first assembling operation on the nut shown in Fig. 9;

Fig. 11 is a section showing the nut after the first operation has been performed;

Fig. 12 is a top plan view of the nut shown in Fig. 11 after the first assembling operation has been performed;

Fig. 13 is a section showing the nut after the final closing operation has been performed;

Fig. 14 is a top plan view of the nut after the final assembling operation; and

Fig. 15 is a section showing the nut with a bolt threaded therein.

Referring now to the drawings, 10 indicates the body of a hexagonal nut having a threaded bore 12 at one end of which there is provided the washer or well 14 the wall of which is defined by the upper portion of the nut body which terminates in a rim or flange 16 adapted to be inturned or crimped over the insert or washer 18.

For reasons hereinafter more fully explained, the portion 16a of the rim which extends above the level of the upper surface 18a of the insert is counterbored or otherwise made of thinner section than the portion 16b of the body which is to surround the washer, there being an abrupt change in the thickness of the material approximately at the level of the surface 18a. The upper thinner portion of the rim is preferably made thinner than the portion below by counterboring or otherwise enlarging the diameter of the inner wall of the rim rather than by reducing the diameter of the outer surface of the wall, for reasons hereinafter appearing.

In order to assemble a locking washer in the above described blank in accordance with this invention, the insert 18, which for purposes of discussion may be assumed to be of the usual variety of laminated fiber or like material having elastic qualities, is placed in the well as shown in Fig. 2 and thereafter the upper portion of the rim, which extends above the level of the washer, is radially indented at peripherally spaced places by means of a suitably shaped punch 20. The punch 20 is preferably formed to provide V-shaped projections 22 which result in the formation of radially inwardly extending indentations 24 of V-shaped form in the upper portion 16a of the rim. The number of such indentations may be varied depending upon the size of the nut. Preferably, however, for reasons which will appear later, a minimum of four such indentations is employed although in the case of very small nuts a lesser number may be used.

With the nut indented by the first operation to the form shown in Fig. 3, it will be apparent that from the standpoint of further deformation the upper and lower portions of the wall or rim defining the washer well have entirely different characteristics, the lower portion being in the form of a uniformly circular wall which at all places will equally resist anything tending to deform it inwardly. On the other hand, the portion in which the indentations 24 are formed is relatively very much weaker with respect to inward deformation. This portion consists of the undeformed sections or segments 26 which may readily be bent inwardly because of the lack of uniformity of the circular section and the relative ease with which the V-shaped walls of the indentations 24 can be bent together. If we consider for a moment an undeformed circular rim it will be evident that for such a rim to be crimped over the washer the diameter and consequently the circumference of the upper edge of the rim must be very considerably reduced. This is done in accordance with prior procedures, which require among other things that the section of the rim be thickened as its diameter is reduced. This necessitates cold working of the metal and requires the application of considerable power to the punch in order to effect the operation.

In accordance with the present invention the rim, after the preliminary indenting operation, is finally closed by means of a closing punch 28 as shown in Fig. 4. In this operation the V-walls of the indentations 24 are bent together and the spaces provided by the closing of the V's permit the sections 26 to be bent over substantially without compression. The indentations are driven downwardly to provide relatively deeply penetrative stakes 30 which serve to securely anchor the washer against rotation in the well. In order to secure the most advantageous results the form of the indentations 24 is preferably made such that the sum of the lengths $a$ (Fig. 3) of the top edges of the sections 26 is very nearly equal to the perimeter of the circle $b$ (Fig. 5) to which these edges are to be finally bent. When this is done, the ends of the sections 26 in effect fold over the lower portions of the stakes 30, which assume a more or less bulbous re-entrant form as shown in Fig. 6. By this means a deep and effective stake is obtained while at the same time the metal of the rim, which must of necessity be of relatively thin section, can be made to fold over without bending back sharply upon itself and inducing the risk of cracking. I have found from experience that in forming the indentations, most satisfactory results are usually obtained by indenting radially inwardly about 45°. The included angle between the walls of the indentations will, of course, vary depending upon the relations of the original diameter of the lip and the diameter of the circle $b$ to which the upper edge of the lip will be bent.

Because of the very firm stake accomplished by stakes of the kind produced by the above described method, it is not necessary to depend upon pressure contact of the sections 26 on the washer and this leads to further basically important advantages constituting another phase of the invention. To better understand this, brief consideration should be given to certain fundamentals of the action of the device when in use and of the factors desired to be obtained in order to secure the desired holding power. When a thread is impressed in an insert of the kind under consideration, as for example compressed fiber, material is displaced by plastic flow and the desired result is to produce a condition after the device has been applied in which the material of the insert is confined and under compression in its cavity or well, so that it will exert strong radial pressure against the member threaded through the insert. If the continuity of such pressure over considerable periods of time is to be reliably obtained, it is necessary for the cavity or well to be completely filled, since the nature of material permitting a thread to be impressed in it is such that through further plastic flow after the impression of a thread, initially produced internal pressure might gradually be relieved by further plastic flow if the cavity were not entirely filled with confined insert material under pressure.

With the foregoing in mind and as shown in Figs. 4 and 7 the sections 26, in accordance with this phase of the invention, are bent over by the punch 28 preferably to a flat section as shown in Fig. 7, with preferably a small clearance space 32 between the lip and the top surface of the washer. Also, the diameter of the bore 18b of the washer may be as small as the minor diameter of the thread 12 so that a bolt of proper size screwed through the washer must impress in the washer a full depth thread. This will necessitate plastic flow of the material of the washer, to take care of the material displaced by the thread, but the clearance space between the washer and the lip provides room for this displaced material or substantially all of it, which otherwise would have to be forced out through the narrow annular space between the inner edge of the lip and the bolt passing through the nut. The exact amount of clearance is not critical since if there is some excess displaced material it can be forced out through this annular space in the form of a thin ring, without appreciable injury to the washer. Because of the fact that the precise amount of clearance is not critical a very important manufacturing advantage is obtained as compared with previous practice, since all tolerances required to take care of the variations encountered in commercial manufacture can be so specified that such variations result in varying the amount of this clearance rather than in varying the pressure exerted on the washer by the lip as has heretofore been the case.

It will be apparent that the preliminary indenting of the lip and the formation of the upper portion of the lip with a thinner counterbored wall both contribute to the creation of what may be termed a critical bending zone at approximately the level of the upper surface of the washer 18, this critical bending zone being indicated by the dotted line c—c in Fig. 3, so that when the final closing operation is performed the lip will naturally bend sharply at this critical zone, leaving the lower portion 16b of the wall in its original form, undistorted inwardly, and not exerting heavy radial pressure on the washer and tending to shear it in radial direction. This is particularly advantageous when washers are used the laminations of which can comparatively easily be separated by shear action.

It will further be apparent that either one of the expedients of making the upper portion of the lip of thinner section or of indenting this portion of the lip may be sufficient alone to create the desired critical bending zone necessary to secure the sharp cornered bending over of the lip and in certain instances, in order to secure this sharp bending effect, one or the other of these expedients may be used alone. Other means for providing a critical bending zone may also be employed as, for example, by providing a groove such as that shown at 16c in Fig. 8. If the critical bending zone is created wholly or in part by either thinning the wall or grooving it, the thinning or grooving is advantageously on the inner wall surface rather than the outer, since the inner portion of the wall is subjected to compression when the lip is bent over while the outer portion of the wall is stretched in tension. Consequently, removal of material from the inner surface of the wall reduces the possibility of the material cracking when it is bent over.

In certain of its aspects the invention is applicable to nuts or other devices of the kind in which the locking washer is received in a well formed within a relatively heavy walled structure. An example of this is shown in Fig. 9 and related figures showing a nut of the kind intended to be engaged by an end socket wrench. In this form of the device the nut body 10a has a cylindrical exterior surface and the insert 18 is received in a recess 14 counterbored at the end of the threaded bore 12. In the present instance, however, a heavy annular wall extends upwardly above the level of the washer and at its end is notched as at 34 for the reception of an end socket wrench. The inner wall of this extension is counterbored to a level above the level of the top of the washer to provide a shoulder 36 and for locking the washer in place a first staking operation is employed which utilizes a broaching punch 38 having a series of peripherally spaced chisel-like broaches 38a as shown in Fig. 10, operating to broach stakes 40 which penetrate the upper portion of the washer 18 as shown in Figs. 11 and 12. The broaching operation that results in the formation of the stakes 40 leaves intervening sections 42 of the internally shouldered portion of the wall, these sections being then broached by an annular broaching tool 44 as indicated in Fig. 13 to provide inwardly turned lip sections which at their ends overlie the stakes 40, as seen in Fig. 14.

As in the previously described embodiment the fact that the wall section which is inturned by the second operation is not continuous enables the metal which is inturned to form the lip to be deformed to a smaller diameter without requiring lateral compression or thickening of the metal, and results in the end portions of the lip sections overlying and reinforcing the stakes. As will be evident from Figs. 5 and 15 it is preferable to limit the peripheral extent of the individual sections of metal that are inturned between adjacent stakes and for this reason it is usually desirable to provide for at least four stakes and intervening separate sections although in very small nuts this number may be reduced and in large nuts it will be desirable to increase the number of stakes to a larger number. The lip sections 42 in the last described embodiment are not pressed into the washer but are turned inwardly so as to provide clearance space 46, into which the material of the washer can flow as indicated at 48 in Fig. 15 when displaced by the threads of the bolt 50, the original upper surface of the washer being indicated by the dotted line 18a. As will be seen from this figure, contact with the bolt thread to the full depth of the thread is obtained between the bolt and the washer and should there be any substantial excess of washer material, it will be squeezed upwardly through the narrow annular space 52 in the form of a fine ring which usually is sheared off by the bolt thread at the level of the inner diameter of the lip 42, with no injurious effect on the washer. As in the form of the device shown in Fig. 1 and related figures the wall of the portion of the well surrounding the washer is not distorted by the closing operations and consequently the washer is not subjected to undesirable radial shear force.

It will be observed that in accordance with the present invention the stakes are forced relatively deeply into the material of the washer and at these isolated spots in the outer portion of the washer the fiber or other material is crushed. This, however, has no adverse effect on the holding power of the washer because of the relatively very small areas which are crushed and their widely separated location in the outer part of the washer. This is in contrast with the serious effect of the crushing and shearing which takes place around the entire periphery of the washer in accordance with previously employed methods for locking the washer in place.

It will be observed that the improved results obtained in accordance with the present invention are achieved without breaking the continuity of the wall structure serving to hold the washer in place. In the form shown in Fig. 1 and related figures the wall of the well around the washer and also the retaining rim or lip are peripherally continuous, which is of material importance particularly with respect to the lip portion, since with this continuity of structure the possibility of cracks starting at places where the material is split or otherwise severed are avoided. In the form shown in Fig. 9 and related figures there is a severance of material at the places where the stakes are formed, but in this form of the device the stakes and intervening sections are integral with and backed up by a relatively very heavy surrounding wall which is peripherally uninterrupted, so that in this form also there is no tendency for the material to start to crack from the points where material is severed.

From the foregoing it will be apparent that the principles of the invention may be applied to wide varieties of specific forms of nuts and other fastening devices in which locking washers are used. The invention is, therefore, to be considered as embracing all novel features of product and method falling within the scope of the appended claims.

What is claimed:

1. The method of closing a perimetrally continuous wall inwardly over a locking insert in a device of the kind described which includes first bending one or more relatively narrow portions inwardly to less than the finally desired extent to preliminarily create an open fold effect in the wall and then applying closing pressure on the remainder of the wall to bend it inwardly over the insert and bend toward each other the walls of said folds.

2. The method set forth in claim 1 in which each narrow portion is bent to a substantially V-shaped form having its apex approximately at the level of the surface of the insert over which it is bent.

3. The method set forth in claim 1 in which the closing pressure is applied only to said remainder of the wall.

4. The method set forth in claim 1 in which each narrow portion is preliminarily bent inwardly to approximately 45° and closing pressure is then applied to the remainder of the wall to bend it inwardly to approximately 90° and thereby cause the sides of each preliminarily bent portion to be folded toward each other and to be bent further inwardly to penetratively engage the insert.

5. The method of closing an upstanding peripherally continuous circular wall inwardly over a locking insert of the kind described which includes bending by a first operation a plurality of peripherally spaced and relatively narrow portions of the wall inwardly to inclined positions to create a multiple open-fold effect in the wall and by a second operation bending the remaining sections of the wall inwardly over the insert to thereby cause the sides of said narrow portions to bend toward each other and bend further inwardly to penetratively engage the surface of the insert, while limiting the inward bending of said remaining sections to avoid substantial axial compression between said sections and the insert as a result of said bending operation.

6. The method of closing an upstanding peripherally continuous circular wall inwardly over a locking insert of the kind described which includes bending by a first operation a plurality of peripherally spaced and relatively narrow portions of the wall inwardly to inclined positions to create a plurality of inverted substantially V-shaped open folds in said wall and by a second operation bending the remaining sections of the wall inwardly over the insert to thereby cause the sides of said narrow portions to bend toward each other and bend further inwardly to penetratively engage the surface of the insert, the aggregate width of said open folds at the top of the wall before said second operation being such that the aggregate length of the top edges of the remaining sections is substantially equal to the perimeter of the circle to which said top edges are bent by said second operation.

7. In a threaded fastening device of the kind described, a body, a locking insert in said body and a portion of said body forming a continuous annular retaining lip overlying said insert, portions of said lip providing integral peripherally spaced radial stakes bent to penetratively engage the upper surface of said insert, said stakes being formed by folds of material extending to the inner edge of the lip, the bottoms of said stakes inclining toward said insert in radially inward direction, whereby to penetrate the insert to the greatest extent at the radially inward portion of the lip.

8. A device as set forth in claim 7 in which said folds have reentrant sides, the ends of the intervening sections overlying portions of the folds.

9. A device as set forth in claim 7 in which said stakes provide the essential means for retaining the insert against movement in said body and the connecting portions of the lip are bent over to confine the insert without exerting appreciable axial pressure thereon.

10. A semi-finished nut comprising a body having a threaded bore portion, a recess at one end of said bore portion, a locking insert in said recess and a peripherally continuous thin wall portion projecting above said insert, said projecting wall portion having a plurality of inwardly inclined indentations therein, said indentations being in the form of V-shaped open folds the aggregate width of the bases of which is so proportioned to the perimeter of said wall portion that the aggregate length of the top edges of the intervening sections of the wall is approximately equal to the length of the perimeter defined by said edges after said sections are bent inwardly to overlie said insert.

ROBERT LAY HALLOCK.

REFERENCES CITED

The following references are of record in the file of this patent:

UNITED STATES PATENTS

| Number | Name | Date |
| --- | --- | --- |
| 1,550,282 | Rennerfelt | Aug. 18, 1925 |
| 1,729,013 | Rennerfelt | Sept. 24, 1929 |
| 2,102,489 | Simmons | Dec. 14, 1937 |
| 2,255,948 | Swanstrom | Sept. 16, 1941 |
| 2,326,681 | Richardson | Aug. 10, 1943 |
| 2,336,791 | LaBarre | Dec. 14, 1943 |

FOREIGN PATENTS

| Number | Country | Date |
| --- | --- | --- |
| 80,298 | Sweden | May 1, 1934 |

Certificate of Correction

November 8, 1949

Patent No. 2,487,129

ROBERT LAY HALLOCK

It is hereby certified that error appears in the printed specification of the above numbered patent requiring correction as follows:

Column 10, line 12, list of references cited, after "2,336,791 LaBarre -------- Dec. 14, 1943" insert *2,351,057 Luce -------- June 13, 1944;* and that the said Letters Patent should be read with this correction therein that the same may conform to the record of the case in the Patent Office.

Signed and sealed this 7th day of March, A. D. 1950.

[SEAL]

THOMAS F. MURPHY,
*Assistant Commissioner of Patents.*